United States Patent [19]

Tanaka

[11] Patent Number: 4,827,533

[45] Date of Patent: May 2, 1989

[54] METHOD OF SMOOTHING IMAGE SIGNALS

[75] Inventor: Nobuyuki Tanaka, Kanagawa, Japan

[73] Assignee: Fuji Photo Film Co., Ltd., Kanagawa, Japan

[21] Appl. No.: 26,702

[22] Filed: Mar. 17, 1987

[30] Foreign Application Priority Data

Mar. 17, 1986 [JP] Japan .................................. 61-58802
Mar. 28, 1986 [JP] Japan .................................. 61-70596

[51] Int. Cl.$^4$ ............................................. G06K 9/40
[52] U.S. Cl. ..................................... 382/54; 358/136; 382/27
[58] Field of Search ....................... 382/54, 50, 52, 53, 382/27; 358/133, 135, 136; 364/723

[56] References Cited

U.S. PATENT DOCUMENTS

| | | | |
|---|---|---|---|
| 4,251,837 | 2/1981 | Janeway, III | 382/52 |
| 4,498,104 | 2/1985 | Schulz | 382/52 |
| 4,573,070 | 2/1986 | Cooper | 358/167 |
| 4,590,606 | 5/1986 | Rohrer | 382/56 |
| 4,597,009 | 6/1986 | Ballmer et al. | 382/52 |
| 4,605,966 | 8/1986 | Collins | 382/52 |
| 4,692,811 | 9/1987 | Tsuchiya et al. | 382/54 |
| 4,694,342 | 9/1987 | Klees | 382/54 |
| 4,709,274 | 11/1987 | Tanioka | 358/282 |

Primary Examiner—Leo H. Boudreau
Assistant Examiner—Joseph Mancuso
Attorney, Agent, or Firm—Sughrue, Mion, Zinn, Macpeak and Seas

[57] ABSTRACT

A method of smoothing image signals comprises the step of replacing an original image signal at each of the several picture elements of a two-dimensional image by a median value of the image signals at the picture element and a plurality of picture elements in the vicinity of the picture element. When any one or more of the image signals at the plurality of adjacent picture elements have already been replaced by a median value, the image signals obtained by such replacement are used to calculate the median value of the image signal at the subject picture element.

3 Claims, 3 Drawing Sheets

METHOD OF SMOOTHING IMAGE SIGNALS

BACKGROUND OF THE INVENTION

1. Field of the Invention

This invention relates to a method of smoothing image signals. This invention particularly relates to a method of smoothing image signals by use of a median value smoothing technique.

2. Description of the Prior Art

As a method of eliminating noise contained in an image, various image signal smoothing methods based on spatial filtering processing have heretofore been known. Among the image signal smoothing ordinarily methods, mean value smoothing is used. In the mean value smoothing, the image signal at every picture element representing a two-dimensional image is replaced by a mean value of the image signal at said picture element and the image signals at a plurality of the picture elements in the vicinity of said picture element. Though mean value smoothing has the advantage that calculation processing is very easy, it is disadvantageous in that blur of the edge component readily arises.

As a smoothing method suitable for eliminating the aforesaid problem, median value smoothing is known. In median value smoothing, the image signal at every picture element representing a two-dimensional image is replaced by a median value of the image signal at said picture element and the image signals at a plurality of the picture elements in the vicinity of said picture element. For example, as shown in FIG. 3, image signals at picture elements Pf, Pg, Ph and Pi adjacent to a picture element Pe are designated by f, g, h and i, the maximum value among the image signals f to i is f', followed by g', h' and i', i.e. $f' \geq g' \geq h' \geq i'$. In this case, when an image signal e at the picture element Pe satisfies the condition $e > g'$, the image signal e is replaced by the median value $g'$. When $e < h'$, the image signal e is replaced by the median value $h'$. When $g' \geq e \geq h'$, since the median value is equal to e, the original image signal e is employed directly. As the image signals at the picture elements in the vicinity of a picture element which are used for calculating the median value, besides the image signals at the four neighboring picture elements, it is possible to employ, for example image signals at two picture elements adjacent to each other in one direction, image signals at eight neighboring picture elements, or image signals at 24 neighboring picture elements However, in the aforesaid conventional median value smoothing, the image signals after the median value replacement change unnaturally as compared with the original image signals, and therefore the edge component is distorted. The problem will hereinbelow be described in detail with reference to FIGS. 4 and 5. In the most simple case, smoothing is conducted by use of the image signal which is to be smoothed, and the image signals at two adjacent picture elements. In the case where original image signals a, b, c and d at picture elements Pa, Pb, Pc and Pd standing in one direction as shown in FIG. 4 attain values as shown in FIG. 5, since the relationship among the adjacent image signals a, b and c is $a < c < b$, the original image signal b is replaced by $c = b0$. Also since the relationship among the adjacent image signals b, c and d is $c < b < d$, the original image signal c is replaced by $b = c0$. In this case, the original image signals b and c having the relationship of $b > c$ are changed by median value replacement so that $c0 > b0$. Thus the relationship between the original image signal values is reversed by median value replacement. Therefore, when the image is reproduced by use of the image signals a, b0, c0 and d, distortion of the edge component arises as mentioned above.

SUMMARY OF THE INVENTION

The primary object of the present invention is to provide a method of smoothing image signals which prevents distortion of an edge component.

Another object of the present invention is to provide a method of smoothing image signals which is suitable for forming an image having a high image quality free from noise.

The specific object of the present invention is to provide a method of smoothing image signals which has a markedly large smoothing effect at a region where a change in image signal is large, and prevents excessive smoothing at a region where a change in image signal is small, thereby to maintain detail components in an image.

The present invention provides a method of smoothing image signals by replacing an image signal at each of picture elements of a two-dimensional image by a median value of the image signals at said picture element and a plurality of picture elements in the vicinity of said picture element, wherein the improvement comprises, using the image signals obtained by said replacement by said median value as said image signals at said plurality of picture elements when said image signals at said plurality of picture elements have already been subjected to the replacement.

The present invention also provides a method of smoothing image signals, which comprises the steps of:

(i) designating an original image signal at a picture element P of a two-dimensional image by X, designating image signals at picture elements Pa and Pc adjacent to said picture element P in a longitudinal direction and image signals at picture elements Pb and Pd adjacent to said picture element P in a transverse direction respectively by a, c, b and d and designating positive constants by $\alpha$ and $\beta$, (ii) conducting processing wherein said original image signal X is transformed into X' which is a median value of said original image signal X, $(a+\alpha)$, $(a-\alpha)$, $(b+\beta)$ and $(b-\beta)$ when an absolute value of a difference between said image signals a and b is smaller than a predetermined value Q, and said original image signal X is smoothed based on values of said image signals a and b and transformed thereby into X' when the absolute value of the difference between said image signals a and b is not smaller than the predetermined value Q, said processing being conducted sequentially for the respective original image signals in a predetermined order, wherein a and b denote the transformed signals obtained by conducting said processing for the original image signals at said picture elements Pa and Pb adjacent to said picture element P, (iii) conducting processing wherein said original image signal X is transformed into X'' which is a median value of said original image signal X, $(c+\alpha)$, $(c-\alpha)$, $(d+\beta)$ and $(d-\beta)$ when an absolute value of a difference between said image signals c and d is smaller than the predetermined value Q, and said original signal X is smoothed based on values of said image signals c and d and transformed thereby into X'' when the absolute value of the difference between said image signals c and d is not smaller than the predetermined value Q, said processing being conducted sequentially for the respective original image signals in an order reverse to said predetermined order, wherein c and d denote the transformed signals obtained by conducting said processing for the original image signals at said picture elements Pc and Pd adjacent to said picture element P, and (iv) calculating a mean value of said transformed signal X' and said transformed signal X" at the same picture element, and using the mean values thus obtained as smoothed signals at the respective picture elements.

As the smoothing processing in the second mentioned method, it is possible to utilize, for example, mean value smoothing based on calculations of X'=(a+b)/2 and X"=(c+d)/2.

With the first mentioned method of smoothing image signals in accordance with the present invention, it is possible to conduct smoothing without deteriorating the edge component of the image signals. Therefore, it becomes possible to obtain an image having a high image quality free from noise and distortion at the edge region.

With the second mentioned method of smoothing image signals in accordance with the present invention, smoothing processing having a large smoothing effect is conducted only in regions where the change in the original image signal is large, and the smoothing effect is restricted at regions where the change in the original image signal is small. Therefore, noise perceptible in the image is decreased reliably, and detail components in the image are maintained. Also, in both the regions where the change in the original image signal is large and the regions where the change in the original image signal is small, smoothing processing is conducted based on the transformed signals at the picture elements adjacent in two directions, which are obtained by smoothing processing. Accordingly, there is no risk of change characteristics of the smoothed and transformed signals markedly differing from the change characteristics of the original image signals and, for example, it becomes possible to prevent the edge component from blurring.

DESCRIPTION OF THE PREFERRED EMBODIMENTS

The present invention will hereinbelow be described in further detail with reference to the accompanying drawings.

Figure 1:
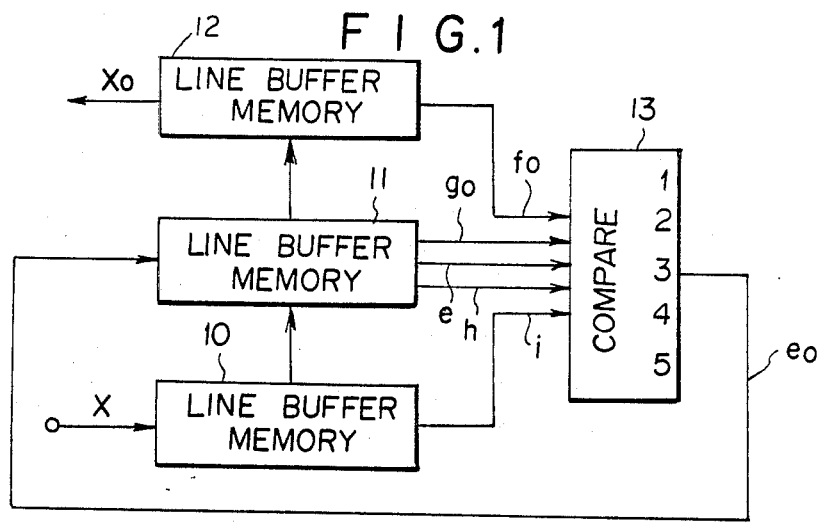
FIG. 1 is a block diagram showing the general configuration of an apparatus for carrying out an embodiment of the method of smoothing image signals in accordance with the present invention.

Referring to FIG. 1, an apparatus for carrying out an embodiment of the method of smoothing image signals in accordance with the present invention is constituted to replace an original image signal at each picture element by a median value of the image signals at said picture element and four picture elements adjacent to said picture element. Original image signals X are sent to and stored in a buffer memory 10 in a unit of a single picture element string. The original image signals in the single picture element string are transmitted to a line buffer memory 11 and then to a line buffer memory 12. In synchronization with the transmission, subsequent original image signals X are sequentially sent to the line buffer memory 10 in the unit of the single picture element string. For example, when the image signals of an n-1'th picture element string including the picture element Pf as shown in FIG. 3 are stored in the line buffer memory 12, the image signals of the next n'th picture element string which include the image signals at the picture elements Pg, Pe and Ph are stored in the line buffer memory 11, and the image signals of the n+1'th picture element string which include the image signal of the picture element Pi are stored in the line buffer memory 10.

Figure 3:
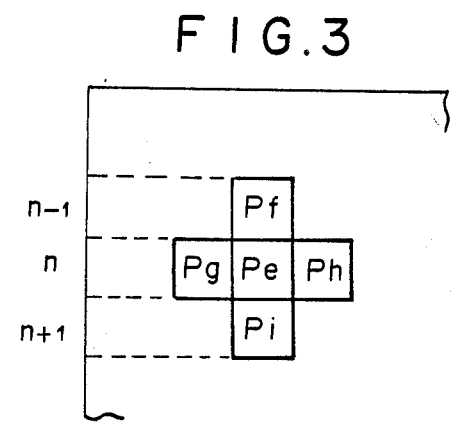

The aforesaid replacement by the median value will hereinbelow be described in detail by taking as an example the case where the image signal at the picture element Pe which is included in the n'th picture element string as shown in FIG. 3 and which is surrounded by the picture elements Pf, Pg, Ph and Pi from four sides is to be smoothed. The original image signal i at the picture element Pi which has not yet been smoothed is read from the line buffer memory 10 and sent to a comparator 13. Also, the original image signal e at the picture element Pe, the original image signal h at the picture element Ph which follows the picture element Pe in the smoothing processing order and which has not yet been subjected to smoothing processing, and an image signal g0 at the picture element Pg which precedes the picture element Pe in the smoothing processing order and which has already been subjected to smoothing processing are read from the line buffer memory 11 and sent to the comparator 13. From the line buffer memory 12, an image signal f0 at the picture element Pf which has already been smoothed is sent to the comparator 13. The comparator 13 compares the image signals e, f0, g0, h and i with one another, and outputs the median value of the five image signals. Specifically, in the case where the maximum value among the image signals f0, g0, h and i is f', followed by g', h' and i', i.e. $f' \geq g' \geq h' \geq i'$, the comparator 13 outputs g' as a median value e0 when $e > g'$, outputs h' as the median value e0 when $e < h'$, and outputs the value of e as the median value e0 when $g' \geq e \geq h'$. The output e0 is sent to the line buffer memory 11 and stored in place of the original image signal e which was stored therein.

The aforesaid smoothing processing (median value replacement processing) is repeated for each of the picture elements from the next picture element Ph to the end picture element (the picture element at the right end of FIG. 3) of the n'th picture element string. As clear from the foregoing description, as the smoothed image signal g0 was used in the course of smoothing of the original image signal e, the smoothed image signal e0 is used in the course of smoothing of the original image signal h at the picture element Ph. When smoothing processing of the image signals at all of the picture elements of the n'th picture element string is finished, the smoothed image signals stored in the line buffer memory 11 are transmitted to the line buffer memory 12. The smoothed image signals X0 stored in the line buffer memory 12 are sent to an image reproducing apparatus such as a cathode ray tube (CRT) or a light beam scanning recording apparatus and used for reproducing a visible image, or sent to a storage apparatus using a storage medium such as an optical disk or a magnetic disk and stored in the storage medium.

As the image signals are transmitted from the line buffer memory 11, the image signals of the n+1'th picture element string stored in the line buffer memory 10 are transmitted to the line buffer memory 11 and smoothed in the same manner as mentioned above. As clear from the foregoing description, as the smoothed image signals f0 and g0 were used in the course of smoothing of the original image signal e, the smoothed image signal e0 is used in the course of smoothing of the original image signal i at the picture element Pi and the original image signal h at the picture element Ph.

Figure 2:
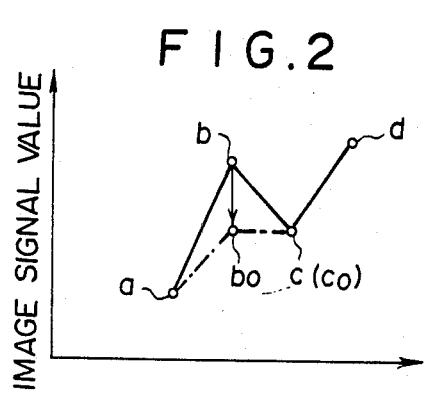
FIG. 2 is an explanatory view showing the effect of smoothing of image signals by the embodiment of FIG. 1, FIG. 3 and 4 are explanatory views showing the relationship between a picture element subjected to median value replacement in the embodiment of FIG. 1 and picture elements adjacent to said picture element.
Figure 4:
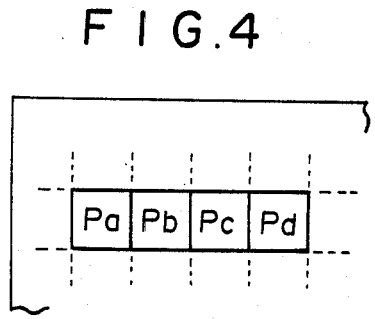
Figure 5:
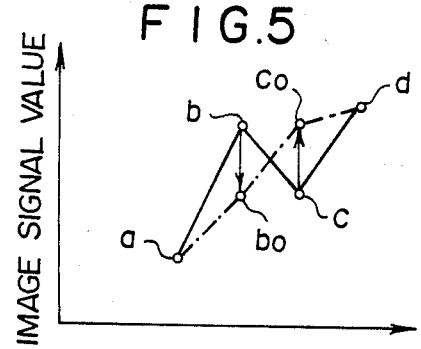
FIG. 5 is an explanatory view showing the effect of conventional median value smoothing.

In the aforesaid embodiment, as for the image signals already subjected to the replacement by the median value, the image signals obtained by the median value replacement are used as the image signals at the adjacent picture elements on which median value replacement is based. Therefore, it is possible to prevent the smoothed image signals from becoming markedly unnatural with respect to the original image signals. The effect will hereinbelow be described in detail by taking as an example the case where smoothing is conducted by utilizing the image signals at two adjacent picture elements. As shown in FIG. 4, the picture elements Pa, Pb, Pc and Pd standing side by side in one direction are considered. The image signals a, b, c and d at the picture elements Pa, Pb, Pc and Pd attain values as shown in FIG. 2 (the same values as in FIG. 5). In this case, though the image signal b is replaced by b0=c, the image signal c is smoothed based on the smoothed image signal b0 and the image signal d. Therefore, the value of the original image signal c becomes the smoothed image signal c0. Accordingly, though the image signal b is smoothed, there is no risk of the relationship between the image signals being reversed from b>c to b0<c0 by smoothing, and it is possible to prevent the edge component from distorting.

As the image signals at the picture elements in the vicinity of a picture element which are used for calculating the median value in the aforesaid embodiment, besides the image signals at the four neighboring picture elements and the image signals at the two neighboring picture elements, it is possible to employ, for example, image signals at eight neighboring picture elements, or image signals at 24 neighboring picture elements.

Figure 6:
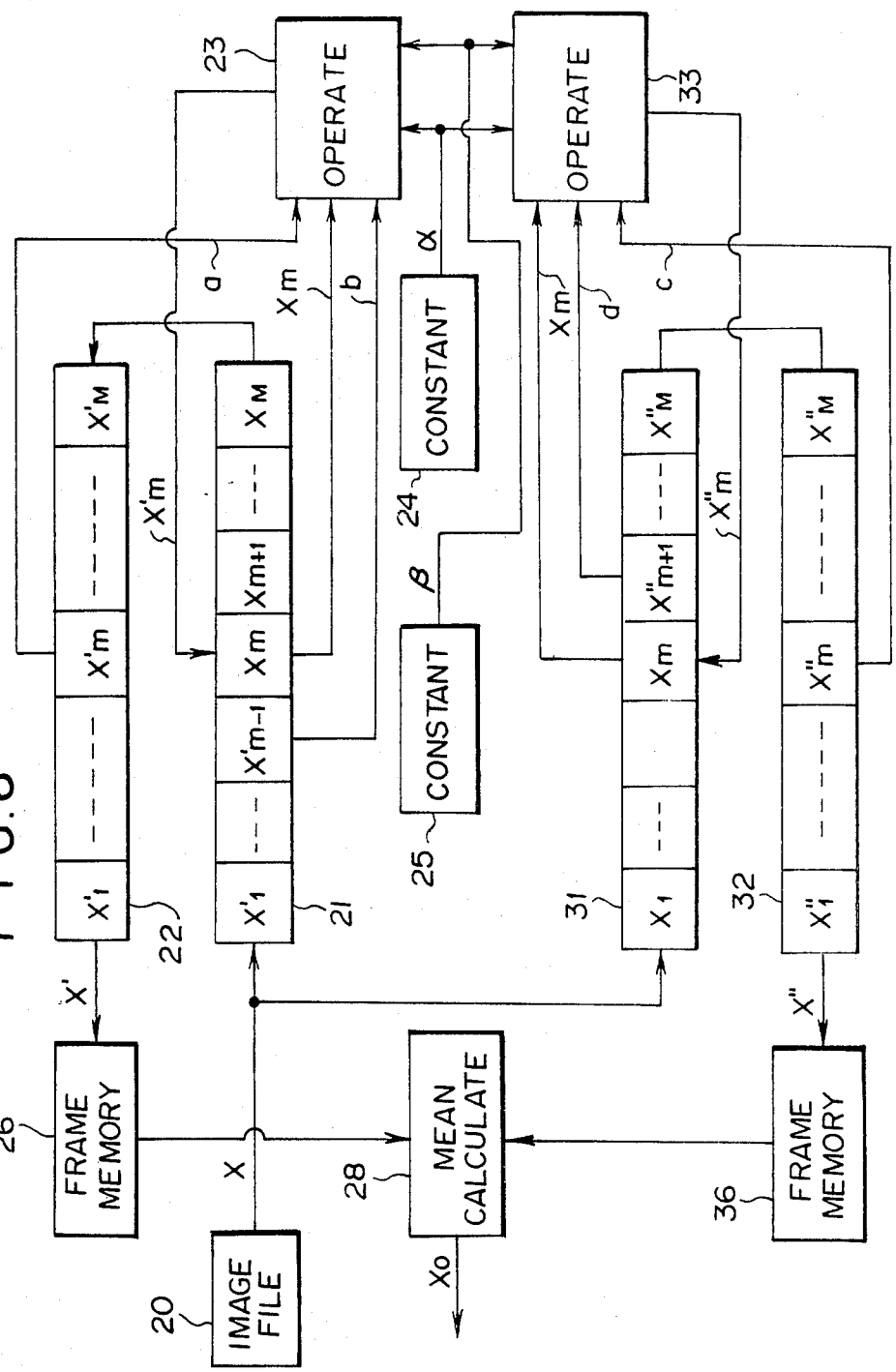
FIG. 6 is a block diagram showing an apparatus for carrying out another embodiment of the method of smoothing image signals in accordance with the present invention.
Figure 7:
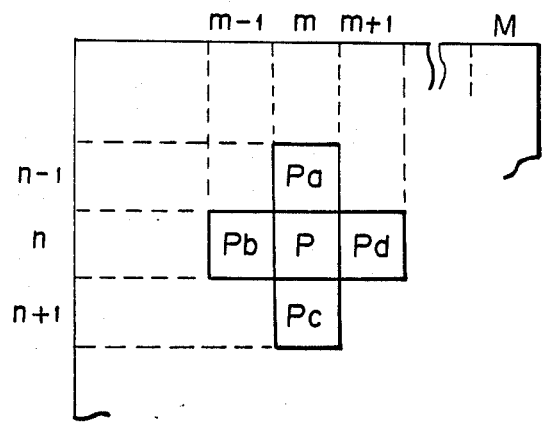
FIG. 7 is an explanatory view showing the relationship between a picture element subjected to smoothing in the embodiment of FIG. 6 and picture elements adjacent to said picture element.

FIG. 6 shows an apparatus for carrying out another embodiment of the method of smoothing image signals in accordance with the present invention. The apparatus shown in FIG. 6 is constituted by a computer system or the like, and the original image signals X stored in an image file 20 constituted by an optical disk, a magnetic disk or the like are sent to a line buffer memory 21 in the unit of a single picture element line and stored therein. The original image signals in the single picture element line (M picture elements) are processed as described later and transmitted to a line buffer memory 22. In synchronization with the transmission, subsequent original image signals X are sequentially sent to a line buffer memory 21 in the unit of a single picture element line. For example, when the image signals (which are transformed image signals as described later) of a n-1'th picture element line as counted from above and including the picture element Pa as shown in FIG. 7 are stored in the line buffer memory 22, the image signals of the n'th picture element line as counted from above which include the image signals at the picture elements Pb, P and Pd are stored in the line buffer memory 21. The picture elements Pa, Pb, and Pd shown in FIG. 7 are the adjacent picture elements on the upper, left, and right sides of the picture element P.

The aforesaid original image signals X are also fed to and stored in a line buffer memory 31. In this case, feeding of the original image signals X to the line buffer memory 31 is started from the lowest picture element line in FIG. 7. The fed original image signals X are processed as described later and then transmitted to a line buffer memory 32. Specifically, when the image signals of the n'th picture element line as counted from above are stored in the line buffer memory 31, the image signals (which are the transformed image signals as described later) of the n+1'th picture element line as counted from above are stored in the line buffer memory 32.

The embodiment of FIG. 6 will hereinbelow be described in detail by taking as an example the case where the image signal at the picture element P on the n'th picture element line in FIG. 7, i.e. at the picture element surrounded by the picture elements Pa, Pb, Pc and Pd, is to be smoothed. The picture element P is included in the m'th picture element column as counted from the left in FIG. 7, and the original image signal at the picture element P is designated by Xm. In this case, the original image signal Xm at the picture element P and an image signal X'm−1 at the picture element Pb adjacent to the picture element P on the left side are read from the line buffer memory 21 and sent to an operating section 23. The image signal X'm−1 at the picture element Pb is not the original image signal, but instead is a transformed image signal obtained by transformation as described later, and will hereinafter be denoted by b. Also, an image signal X'm (which is not the original image signal, but instead is a transformed image signal obtained by transformation as described later) at the picture element Pa adjacent to the picture element P on the upper side is read from the line buffer memory 22 and sent to the operating section 23. The image signal X'm read from the line buffer memory 22 is hereinafter denoted by a.

Figure 8A:
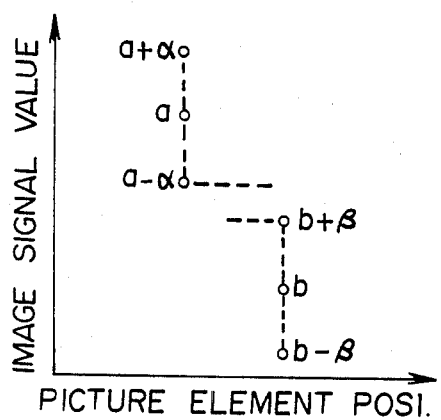
FIGS. 8A, 8B, 9A and 9B are graphs showing examples of distribution of transformed image signal values at adjacent picture elements in the embodiment of FIG. 6.
Figure 8B:
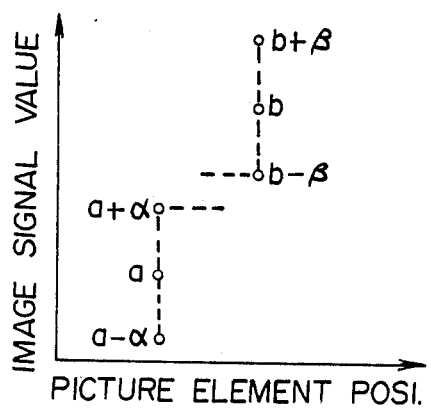
Figure 9A:
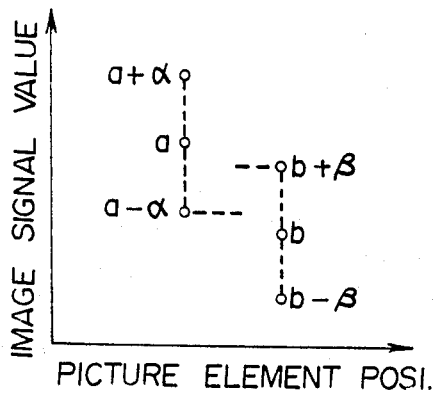
Figure 9B:
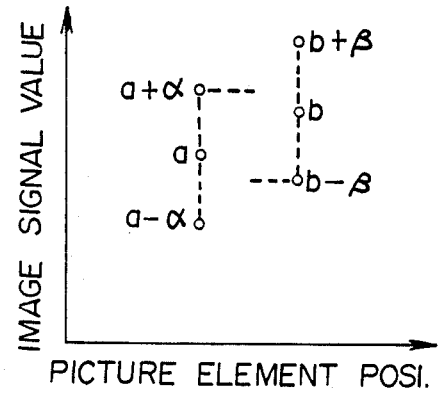

Signals representing positive constants $\alpha$ and $\beta$ generated by constant generating sections 24 and 25 are sent to the operating section 23. The operating section 23 discriminates whether the absolute value $|a-b|$ of the difference between the image signals a and b is smaller than or not smaller than a predetermined value of $Q=(\alpha+\beta)$. As shown in FIG. 8A or 8B, when $|a-b| \geq (\alpha+\beta)$, the operating section 23 calculates the mean value $(a+b)/2$ of the image signals a and b, and outputs the mean value as the transformed image signal (smoothed image signal) X'm for the original image signal Xm.

On the other hand, when $|a-b|<(\alpha+\beta)$, the operating section 23 calculates the median value of $(a+\alpha)$, $(a-\alpha)$, $(b+\beta)$, $(b-\beta)$ and the original image signal Xm, and outputs the median value as the transformed image signal X'm for the original image signal Xm. For example, in the case where $b \leq a$, the median value is Xm when $(a-\alpha) \leq Xm \leq (b+\beta)$,
$b+\beta$ when $(b+\beta)<Xm$, and
$a-\alpha$ when $Xm<(a-\alpha)$.

On the other hand, in the case where $a>b$, the median value is

Xm when $(b-\beta) \leq Xm \leq (a+\alpha)$,
$a+\alpha$ when $(a+\alpha)<Xm$, and
$b-\beta$ when $Xm<(b-\beta)$.

The aforesaid transformed image signal X'm which is the median value or the smoothed image signal is sent to the line buffer memory 21, and written therein in place of the original image signal Xm. When processing for transforming the original image signal Xm to X'm is finished as mentioned above, the address for reading two image signals adjacent to each other in the line buffer memory 21 is advanced by one, and the address for reading out a single image signal in the line buffer memory 22 is advanced by one. Then, the image signals are read from the line buffer memories 21 and 22 in the same manner as mentioned above. Specifically, the original image signal Xm+1 and the aforesaid transformed image signal X'm are read from the line buffer memory 21. From the line buffer memory 22, a transformed image signal X'm+1, i.e. the transformed image signal at the n−1th line, m+1'th column picture element in FIG. 7, is read. The original image signal Xm+1 and the transformed image signals X'm and X'm+1 are sent to the operating section 23, and the original image signal Xm+1 is processed in the same manner as the aforesaid transformation processing conducted for the original image signal Xm. As clear from the foregoing description, the image signal X'm−1 which was read together with the original image signal Xm from the line buffer memory 21 in the course of the transformation processing of the original image signal Xm is the transformed image signal obtained by the aforesaid transformation processing of the original image signal Xm−1 at the picture element Pb in FIG. 7.

When transformation processing of all of the original image signals on the n'th picture element line is finished in the manner as mentioned above, all of the transformed image signals stored in the line buffer memory 21 are transmitted to the line buffer memory 22, and all of the transformed image signals which were stored in the line buffer memory 22 are transmitted to and stored in the frame memory 26. Then, transformation processing is conducted on each of the original image signals on the n+1'th picture element line in FIG. 7 in the same manner as the transformation processing conducted on each of the original image signals on the n'th picture element line. In the same manner, transformation processing is conducted up to the last picture element line. As clear from the foregoing description, the image signal X'm read from the line buffer memory 22 in the course of transformation processing of the original image signal Xm on the n'th picture element line is the transformed image signal obtained by transformation processing of the original image signal Xm at the picture element Pa in FIG. 7. As for the original image signals on the first picture element line and at the first picture element column, since the transformation processing as mentioned above cannot be conducted, the original image signals are directly used as the transformed image signals. As for the original image signals on the second picture element line and at the second picture element column, since transformation processing in exactly the same manner as mentioned above cannot be conducted, similar transformation processing is conducted by use of the original image signals on the first picture element line and the original image signals at the first picture element column.

The original image signals X read from the image file 20 are also fed to the line buffer memory 31 as mentioned above, and processed in the same manner as the aforesaid transformation processing by the line buffer memories 31 and 32 and an operating section 33 of the same type as the operating section 23. However, in this case, feeding of the original image signals X to the line buffer memory 31 is started with the original image signals on the lowest picture element line in FIG. 7, and transformation processing of the original image signals X on each picture element line is conducted from the picture element on the right side of FIG. 7 toward the left side. For example, the original image signal at the picture element P is processed based on the transformed image signal c at the picture element Pc and the transformed image signal d at the picture element Pd. More specifically, in the case where $|c-d| \geq (\alpha+\beta)$, the original image signal Xm is transformed into a smoothed image signal expressed as $(c+d)/2$. In the case where $|c-d|<(\alpha+\beta)$, the original image signal Xm is transformed into a median value of $(c+\alpha)$, $(c-\beta)$, $(d+\beta)$, $(d-\beta)$ and Xm, and used as a transformed image signal X''m. All of the transformed image signals obtained in this manner are transmitted to a frame memory 36 and stored. The value of the constant $\alpha$ is maintained unchanged between the case where the transformed image signal X''m is calculated and the case here the transformed image signal X'm is calculated. However, it is only necessary that the value of the constant $\alpha$ be maintained to be substantially identical and may be slightly different between the two cases. This applies also to the constant $\beta$.

The transformed image signals X' stored in the frame memory 26 and the transformed image signals X'' stored in the frame memory 36 are sequentially read by a mean value calculating section 28, which calculates mean values $X0=(X'+X'')/2$ of the transformed image signals X' and X'' at the respective picture elements. The mean values X0 are output as the smoothed image signals of the original image signals X, and sent to an image reproducing apparatus such as a CRT or light beam scanning recording apparatus for use in image reproduction. Or the mean values X0 are sent to a storage apparatus using a storage medium such as an optical disk or a magnetic disk, and stored in the storage medium, or are subjected to image signal compression.

In the embodiment of FIG. 6, smoothing is conducted by transforming the original image signals X into the values of $(a+b)/2=X'$ and $(c+d)/2=X''$ when $|a-b| \geq (\alpha+\beta)$ and $|c-d|(\alpha+\beta)$. However, the smoothing may also be conducted by other methods having a comparatively high smoothing effect. Also, instead of using $(\alpha+\beta)$ as the predetermined value Q for determining whether to conduct the smoothing processing or to conduct the processing for transformation into the median value, any other appropriate value may be used for this purpose. The constants $\alpha$ and $\beta$ may be equal to each other or different from each other.

I claim:

1. A method of smoothing image signals that combine to define an image comprising a plurality of picture elements each element being represented by an image signal, which comprise the steps of:
   (i) designating an original image signal at a picture element P of a two-dimensional image by a signal value X, designating image signals at a picture elements $P_a$ and $P_c$ adjacent to said picture element P in a longitudinal direction and image signals at picture elements $P_b$ and $P_d$ adjacent to said picture element P in a transverse direction respectively by signal values a, c, b and d, and designating positive constants by $\alpha$ and $\beta$.
   (ii) processing said image signals to yield a transformed original image signal C' by
      (a) transforming said original image signal X into a transformed image signal having a signal value X' which is a median value of said original image signal X, $(a+\alpha)$, $(a-\alpha)$, $(b+\beta)$ and $(b-\beta)$ calculated when an absolute value of a different between the values of said image signals a and b is smaller than a predetermined value Q, and
      (b) smoothing said original image signal X based on values of said image signals a and b and said transformed image signal value X' when the absolute value of the difference between the values of said image signals a and b is not smaller than the predetermined value Q, said processing being conducted sequentially for the respective original image signals in a predetermined order, wherein a and b denote the transformed signals obtained by conducting said processing for the original image signals at said picture elements $P_a$ and $P_b$ adjacent to said picture element P,
   (iii) processing said original image signal X into a transformed image signal having a value by
      (a) calculating X" a median value of said original image signal X, $(c+\alpha)$, $(c-\alpha)$, $(d+\beta)$ and $(d-\beta)$ when an absolute value of a difference between said image signals c and d is smaller than the predetermined value Q, and
      (b) smoothing said original image said X based on values of said image signals c and d and said transformed image signal value X" when the absolute value of the difference between said image signals c and d is not smaller than the predetermined value Q, said processing being conducted sequentially for the respective original image signals in an order reverse to said predetermined order, wherein c and d denote the transformed signals obtained by conducting said processing for the original image signals at said picture elements $P_c$ and $P_d$ adjacent to said picture element P, and
   (iv) calculating a mean value of said transformed signal X' and said transformed signals X" at the same picture element, and using the mean values thus obtained as smoothed signals at the respective picture elements.

2. A method as defined in claim 1 wherein the step of smoothing of said original image signal X is accomplished in step (ii) by taking the mean value according to the calculation $X'=(a+b)/2$ and is accomplished in step (iii) by taking the mean value according to the calculation $X''=(c+d)/2$.

3. A method as defined in claim 1 wherein said predetermined value Q is $Q=\alpha+\beta$.

* * * * *